US007080378B1

(12) United States Patent
Noland et al.

(10) Patent No.: US 7,080,378 B1
(45) Date of Patent: Jul. 18, 2006

(54) WORKLOAD BALANCING USING DYNAMICALLY ALLOCATED VIRTUAL SERVERS

(75) Inventors: Thomas Nelson Noland, Louisville, CO (US); Charles A. Milligan, Golden, CO (US); Leslie K. Hodge, Westminster, CO (US)

(73) Assignee: Storage Technology Corporation, Louisville, CO (US)

( * ) Notice: Subject to any disclaimer, the term of this patent is extended or adjusted under 35 U.S.C. 154(b) by 659 days.

(21) Appl. No.: 10/150,174

(22) Filed: May 17, 2002

(51) Int. Cl.
G06F 9/46 (2006.01)

(52) U.S. Cl. .................. 718/104; 718/105; 709/224; 709/226

(58) Field of Classification Search ............... 718/100, 718/104, 105; 709/224, 226
See application file for complete search history.

(56) References Cited

U.S. PATENT DOCUMENTS

| | | | | |
|---|---|---|---|---|
| 4,965,719 | A | 10/1990 | Shoens et al. ............... | 364/200 |
| 5,403,639 | A | 4/1995 | Belsan et al. ................ | 305/600 |
| 5,708,834 | A * | 1/1998 | Sasaki et al. ................ | 709/203 |
| 5,951,694 | A * | 9/1999 | Choquier et al. ............. | 714/15 |
| 5,974,462 | A * | 10/1999 | Aman et al. ................. | 709/225 |
| 6,209,002 | B1 | 3/2001 | Gagne et al. ................ | 707/204 |
| 6,230,183 | B1 * | 5/2001 | Yocom et al. ............... | 718/105 |
| 6,477,544 | B1 | 11/2002 | Bolosky et al. ............. | 707/200 |
| 6,539,381 | B1 | 3/2003 | Prasad et al. ................. | 707/10 |
| 6,665,675 | B1 | 12/2003 | Mitaru ......................... | 707/10 |
| 6,732,186 | B1 * | 5/2004 | Hebert ......................... | 709/239 |
| 6,779,016 | B1 | 8/2004 | Aziz et al. .................... | 709/201 |
| 6,779,094 | B1 | 8/2004 | Selkirk et al. ............... | 711/165 |
| 6,779,095 | B1 | 8/2004 | Selkirk et al. ............... | 711/165 |
| 6,801,949 | B1 * | 10/2004 | Bruck et al. ................. | 709/232 |
| 6,804,755 | B1 | 10/2004 | Selkirk et al. ............... | 711/165 |
| 6,816,905 | B1 * | 11/2004 | Sheets et al. ................ | 709/226 |
| 6,859,830 | B1 * | 2/2005 | Ronneburg et al. ......... | 709/224 |
| 6,868,442 | B1 * | 3/2005 | Burdeau ...................... | 709/223 |
| 6,880,156 | B1 * | 4/2005 | Landherr et al. ............ | 718/105 |
| 6,944,785 | B1 * | 9/2005 | Gadir et al. ................... | 714/4 |
| 2001/0052016 | A1 * | 12/2001 | Skene et al. ................ | 709/226 |
| 2002/0053009 | A1 | 5/2002 | Selkirk et al. ............... | 711/162 |
| 2002/0069369 | A1 | 6/2002 | Tremain ...................... | 713/201 |
| 2002/0087612 | A1 * | 7/2002 | Harper et al. ............... | 709/100 |
| 2002/0091872 | A1 | 7/2002 | Bourke-Dunphy et al. . | 709/316 |
| 2002/0120660 | A1 | 8/2002 | Hay et al. .................... | 709/100 |

(Continued)

OTHER PUBLICATIONS

Buyya, Rajkumar et al. "Single System Image (SSI)." Computing Applications. The International Journal of High Performance Computing Applications, Summer 2001.*

(Continued)

Primary Examiner—Lewis A. Bullock, Jr.
Assistant Examiner—Lilian Vo
(74) Attorney, Agent, or Firm—Yee & Associates, P.C.

(57) ABSTRACT

A method for scaling resources according to workload among virtual servers running on a mainframe computer is provided. The invention comprises monitoring the number of service requests received by a cluster of virtual servers and determining if the service requests exceed a specified service limit for the servers. If the number of service requests exceeds the specified service limit, a new virtual server is automatically deployed by a software solution. This additional virtual server performs identical services as the other virtual servers in the cluster. This process is repeated until there are a sufficient number of servers to handle the workload. Service requests are then allocated among the cluster of virtual servers, until the number of requests falls below a certain threshold, at which point the extra servers are automatically deactivated.

16 Claims, 3 Drawing Sheets

U.S. PATENT DOCUMENTS

| | | | |
|---|---|---|---|
| 2002/0152322 A1* | 10/2002 | Hay | 709/245 |
| 2002/0178335 A1 | 11/2002 | Selkirk et al. | 711/162 |
| 2003/0005248 A1 | 1/2003 | Selkirk et al. | 711/165 |
| 2003/0018927 A1* | 1/2003 | Gadir et al. | 714/4 |
| 2003/0023743 A1* | 1/2003 | Raphel et al. | 709/232 |
| 2003/0038961 A1* | 2/2003 | Lynch et al. | 358/1.15 |
| 2003/0055971 A1* | 3/2003 | Menon | 709/226 |
| 2003/0069974 A1* | 4/2003 | Lu et al. | 709/226 |
| 2003/0217131 A1* | 11/2003 | Hodge et al. | 709/223 |
| 2003/0233328 A1* | 12/2003 | Scott et al. | 705/50 |

OTHER PUBLICATIONS

Hodge et al. Processing Distribution Using Instant Copy.

\* cited by examiner

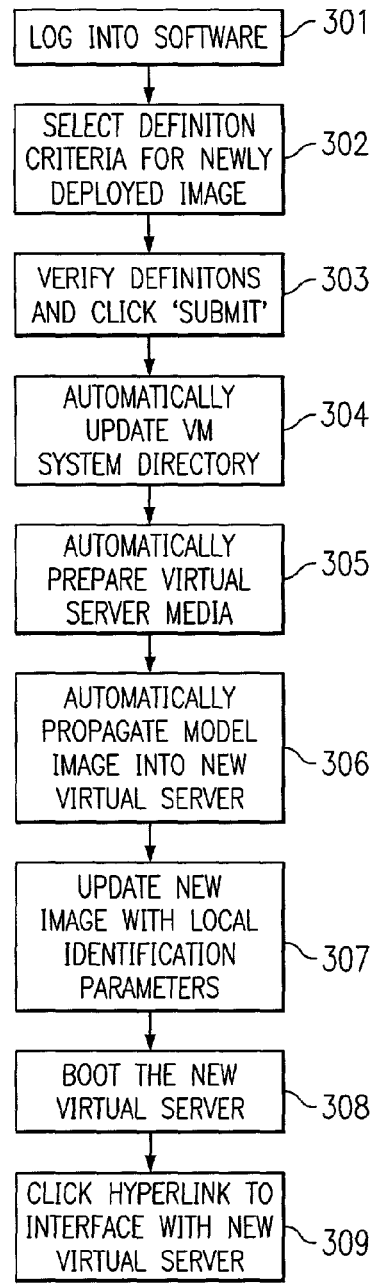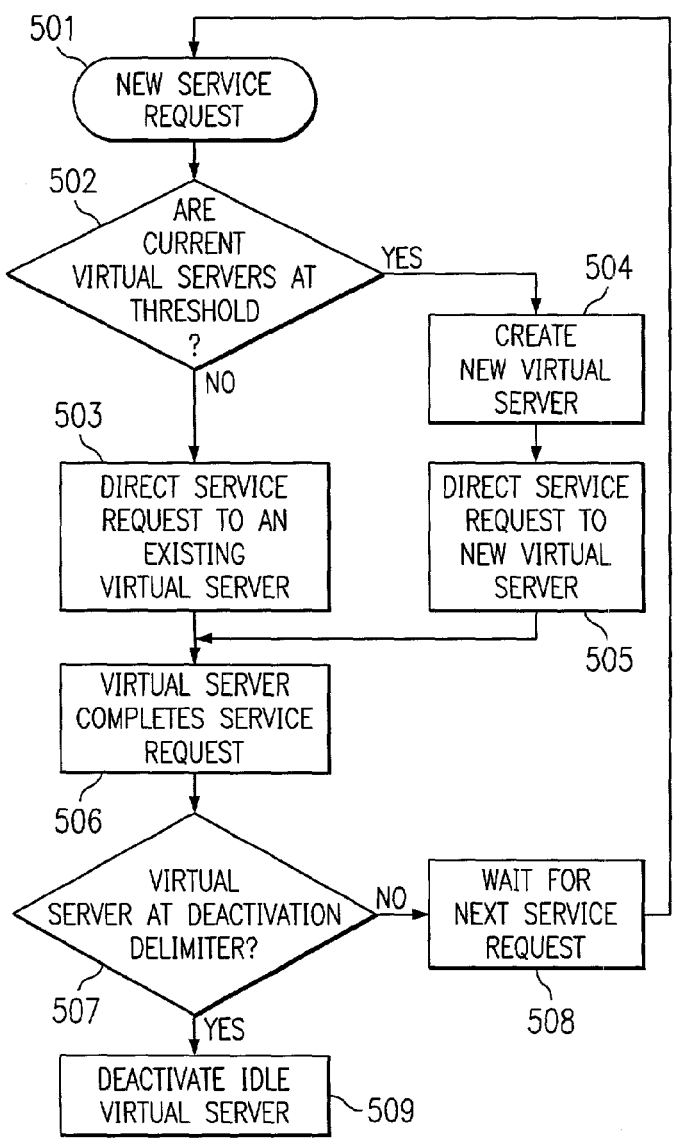

WORKLOAD BALANCING USING DYNAMICALLY ALLOCATED VIRTUAL SERVERS

CROSS REFERENCE TO RELATED APPLICATIONS

The present application is related to co-pending U.S. patent application Ser. No. 10/147,831 entitled "PROCESSING DISTRIBUTION USING INSTANT COPY" filed May 17, 2002. The content of the above mentioned commonly assigned, co-pending U.S. patent applications are hereby incorporated herein by reference for all purposes.

BACKGROUND OF THE INVENTION

1. Field of the Invention

The present invention relates generally to computer networks, and more specifically to the scalability of a multiple server environment hosted on a mainframe computer.

2. Background of the Invention

As traffic on computer networks increases, the demand placed on servers often causes these servers to become overloaded. This is particularly true for web servers. One solution to the problem of increased server loads is to upgrade the individual servers. However, the upgrade process is complex and expensive, and may need to be performed repeatedly if the workload continues to increase.

A better solution is the multi-server approach, in which network requests come to a single address and are redirected to a cluster of servers. Each server then handles only a portion of the requests that come to the specified network address. When load increases, new servers can be added to the cluster to handle the increased workload.

It is now possible to host these servers on a single mainframe computer. Each server has its own independent operating system running on the mainframe. Hosting these virtual servers on the mainframe results in lower operating costs because less power, physical space, and trained personnel are required to maintain them.

However, the virtual servers become system bound when the service requests exceed the service capacity of the virtual server. The interrupt handler that services external requests is unable to process user requests in a responsive manner, and queues build up in the system. At this point, the server resource becomes effectively unavailable to the end users. Until the existing processes are complete, the application hosted on the virtual servers is unable to accommodate new service requests, and performance declines, sometimes drastically.

Currently, it is necessary for a qualified technician to spend hours to create a new virtual server (and operating system). Therefore, it would be desirable to have a method for quickly and efficiently instantiating new virtual servers, and then using those servers to aid in handling the increased workload.

SUMMARY OF THE INVENTION

The present invention provides a method for scaling resources according to workload among virtual servers running on a mainframe computer. The invention functions by monitoring existing virtual server performance, and then being responsive to a multiplicity of various potential limiting conditions. For example, if some predefined resource in the virtual servers, such as CPU usage or a request queue into the cluster of servers, should reach a critical threshold, then one or more new virtual server(s) are automatically deployed. These new virtual servers are identified as additional virtual servers and can be constructed to perform identical services as the other servers in the cluster. Alternatively some additional servers can be constructed to add a new function to the service cluster or to provide only a subset of the service available from the service cluster. This process is repeated until there are a sufficient number of servers to handle the workload. Service requests are allocated among all the appropriate servers in the cluster of virtual servers until one or more of a multiplicity of various potential delimiting conditions is identified such as the number of requests falling below a certain threshold. When a delimiting condition arises, some of the extra servers are identified as no longer needed and are automatically deactivated. In one embodiment of the present invention, servers are deactivated after they have been idle for a specified length of time.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 depicts a flowchart illustrating the process of deploying a virtual server by means of an automated software solution in accordance with the present invention;

FIG. 5 depicts a flowchart illustrating the process of load balancing among virtual servers in accordance with the present invention.

DETAILED DESCRIPTION OF THE PREFERRED EMBODIMENT

Figure 1:
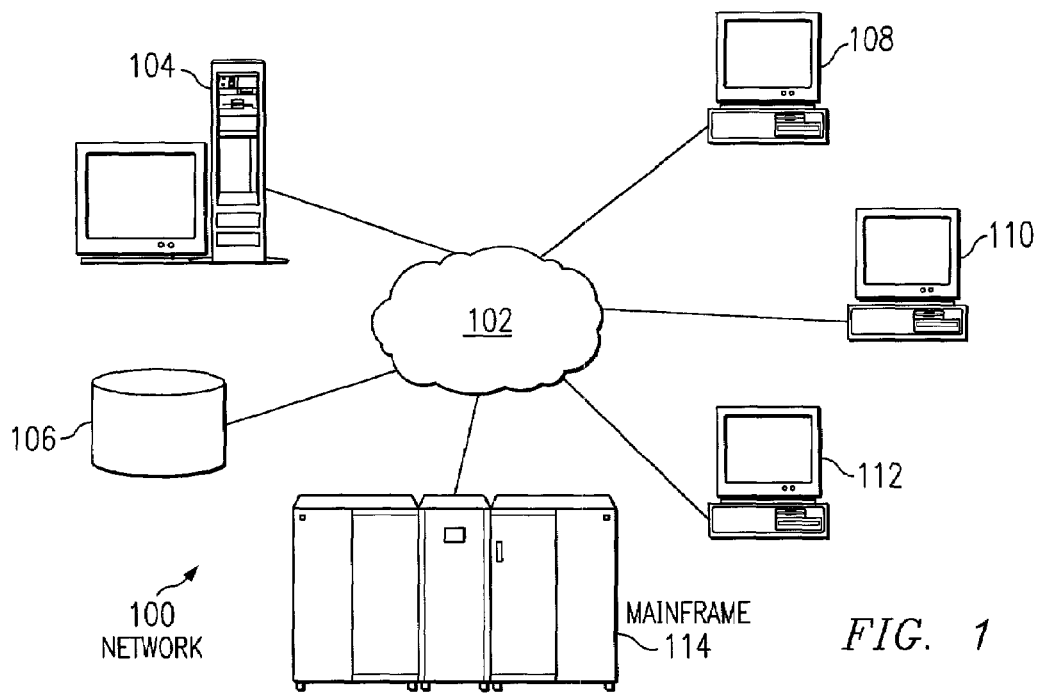
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with mainframe 114 and storage unit 106. In addition, clients 108, 110, and 112 also are connected to network 102. These clients 108, 110, and 112 may be, for example, personal computers or network computers. In the depicted example, server 104 and mainframe 114 may provide data, such as boot files, operating system images, and applications to clients 108–112. In addition, mainframe 114 may host one or several virtual servers. Clients 108, 110, and 112 are clients to server 104 and mainframe 114. Network data processing system 100 may also include additional servers, clients, and other devices not shown (e.g., printers).

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
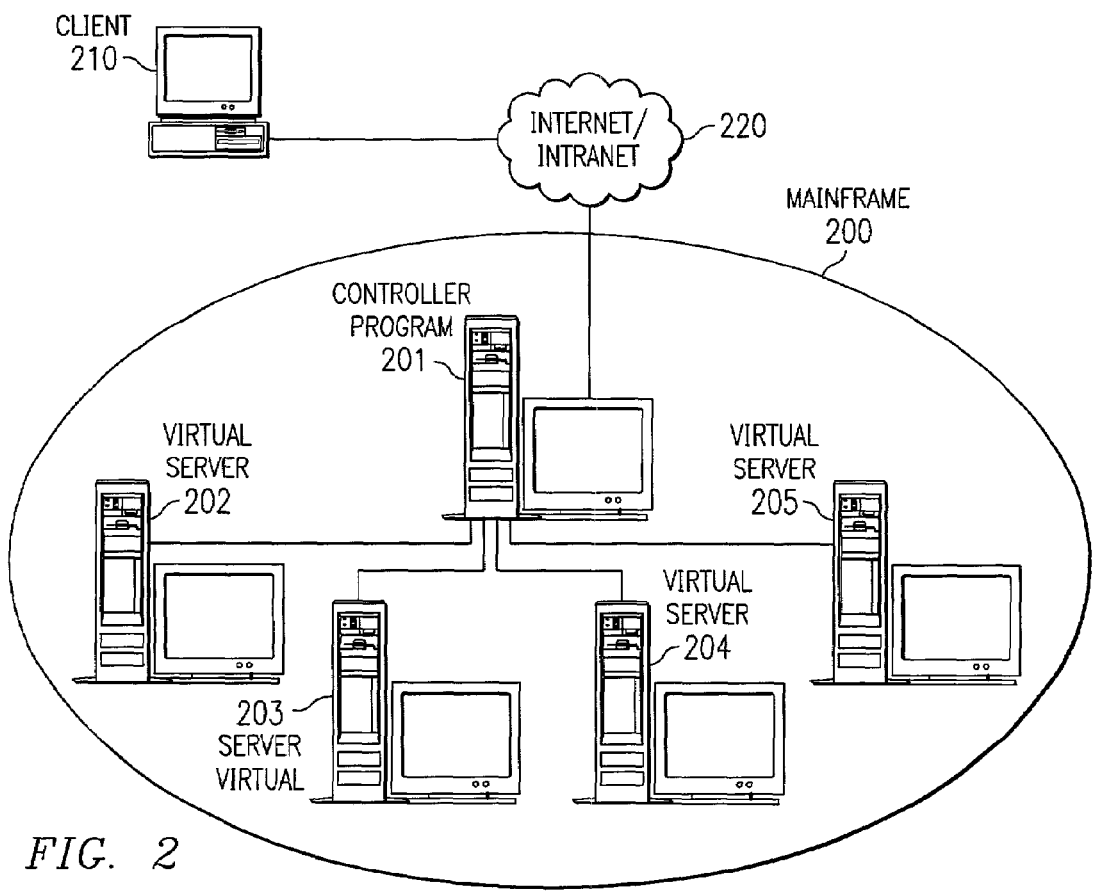
FIG. 2 depicts a schematic diagram illustrating virtual servers deployed on a mainframe in accordance with the present invention.

Referring now to FIG. 2, a schematic diagram illustrating virtual servers deployed on a mainframe is depicted in accordance with the present invention. The virtual server 200 hosts multiple virtual servers 202–205, which contain identical applications. Alternatively, the virtual servers 202–205 can individually have selective subsets of the overall server process, with only the critical elements replicated to provide broader service. Though each virtual server 202–205 has its own IP address, the architecture of the virtual server cluster is transparent to the client 210, which sees only a single server.

The Control Program 201 is a component of the Virtual Machine (VM) hypervisor that is responsible for dispatch and control functions. The Control Program 201 will dispatch virtual machines from an "eligible to run" list based upon various parameters (e.g., priority, I/O status, memory overhead support, etc.). Control Program 201 also controls and virtualizes the TCP/IP processing for TCP/IP requests coming from outside the mainframe 200 (i.e. from network 220). The granularity of scheduling requests is per connection.

As it relates to the virtual servers 202–205, the primary purposes of the Control Program 201 are to (1) dispatch virtual machines (servers) for a given timeslice and (2) dispatch I/O to and from storage, network 220, and display devices. The Control Program 201 does not actually control the activity that occurs inside a virtual server environment. Instead, the Control Program 201 manages the resources used by the virtual servers for their own independent processing. In addition, the Control Program 201 may also be a server itself.

Scalability for virtual server cluster is achieved by transparently adding or removing nodes from the cluster of virtual servers (described below). Failover is provided by detecting node failures and reconfiguring the system appropriately.

Referring to FIG. 3, a flowchart illustrating the process of deploying a virtual server by means of an automated software solution is depicted in accordance with the present invention. The process begins when the user logs into the software (step 301) and selects definition criteria for the newly deployed system image (step 302). The definition criteria include the following: a pool of TCP/IP addresses that the software assigns to newly deployed virtual servers, a pool of names the software assigns to the new virtual servers, and a model image that is used as a target image for the creation and deployment of the new virtual server. The model image is the current contents of memory, including the operating system and running programs. Every new virtual server is an exact copy of the model image, except for the dynamic network and server definitions that identify the new server as a unique entity.

The user verifies the definition criteria and clicks a "submit" link (step 303). This link contained an imbedded command sequence that requests the software to rapidly deploy a new virtual server. Alternatively, the step of deploying the new virtual server may be automated and triggered by specified event, e.g., reaching a saturation threshold on currently deployed servers (as described in more detail below). Furthermore, the new virtual server can actually be a subset of the original server that focuses on a critical portion of the process. This can be done in several ways. For example, the virtual server can be composed of a series of linked server processes that are individually utilized in the overall server process. When one of the sub processes becomes a bottleneck, that sub process could be cloned as necessary to eliminate the bottleneck.

In response to the request from the user, the software automatically updates the VM system directory to include the new virtual server (step 304), prepares the virtual server media (disk allocations) (step 305), propagates the server model image into the new virtual server (step 306), updates the new image with local identification parameters (step 307), and then boots the new server (step 308).

After the new virtual server is deployed, the end user simply clicks another link in order to interface with the new server (step 309). Alternatively, the new server may be automatically integrated into a preexisting server cluster.

The entire process of deploying a new virtual server by means of the present invention can be fully automated. When done manually, it takes less than five minutes. In addition, the user needs little or no technical knowledge to use the present invention.

Figure 4:
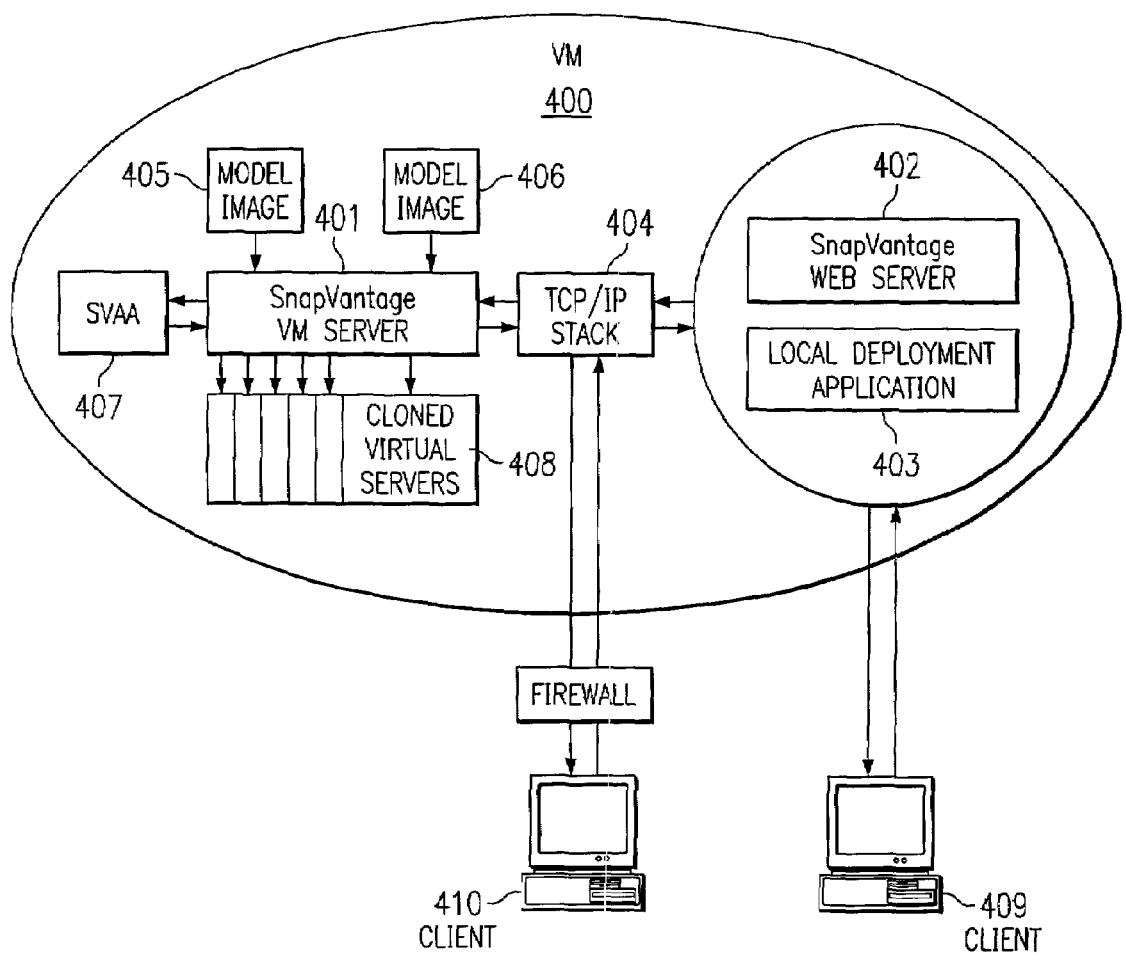
FIG. 4 depicts a schematic diagram illustrating the architecture of the virtual machine environment of the automated software solution in accordance with the present invention.

Referring now to FIG. 4, a schematic diagram illustrating the architecture of the virtual machine environment of the automated software solution is depicted in accordance with the present invention. The present example is described within the context of the SnapVantage software solution, but it should be pointed out that the features of the present invention may be implemented by means of other software solutions.

SnapVantage provides an administrator facility on client 409 (i.e. web GUI or command line interface) to clone, manage, and deploy Linux system images running under the VM operating system. The SnapVantage architecture 400 has three primary components: the VM server 401, the SnapVantage web server 402, and the local deployment application 403.

The SnapVantage VM server 401 is a VM virtual service machine that manages the cloning process of Linux images, i.e. Model Images 405 and 406. This cloning process uses a Shared Virtual Array Administrator (SVAA) 407 in order to create array of cloned virtual servers 408. SnapVantage runs disconnected and communicates to clients 409 and 410 via TCP/IP 404.

The SnapVantage web server 402 is the location of the web pages used by the SnapVantage GUI on client 409, and executes under a local Apache (or other) web server.

The local deployment application 403 is the user-created code imbedded in local web pages that drives specific SnapVantage functions. This component is deployed in environments that choose to allow end users to define a new virtual server.

Referring now to FIG. 5, a flowchart illustrating the process of load balancing among virtual servers is depicted in accordance with the present invention. The present invention provides a software-based solution that utilizes a communication mechanism in either direction and monitors the load status of deployed servers.

When a new service request is received (step 501), the controller software determines if the currently deployed virtual servers are approaching their defined service capacity (step 502), which would result in a near-term service-saturation condition within the virtual servers. For example, this monitoring and determination may be facilitated by an interval timer that schedules a process scan of the status of virtual server control blocks, or by means of an interrupt scheme. The set of virtual servers available is not constrained to one physical location or one control mechanism. For example, the servers could be executed in a federated or network connected set of computing platforms. The "queue" of work in front of a virtual server cluster can be implemented in a set of federated or even network connected queuing processes. Each queuing process could in fact have a filter that gives priority to the type of work that is allowed to enter or to be efficiently executed in a particular virtual server instance.

If the deployed virtual servers are not at the defined saturation threshold, the controller software directs the new service request to one of the deployed servers (step 503).

However, if the deployed virtual servers are close to near-term service saturation, the software will create and deploy a new virtual server with identical applications (step 504), and then direct the service request to this new server (step 505). This new virtual server can be deployed and activated via the method depicted in FIG. 3. More than one new virtual server may be deployed and activated based on the saturation condition that is detected (e.g., rate of saturation, number of servers approaching saturation simultaneously, etc.).

After the service request has been directed to the appropriate virtual server, the server completes the requested service (step 506).

After the requested service is complete the software determines if the virtual server remains idle for a specified length of time (deactivation delimiter) (step 507). In other words, the software determines if the virtual server is still needed to process additional service requests. The deployed virtual servers remain active until the saturation condition is no longer detected.

If the virtual server is has not reached a deactivation delimiter (e.g., it is still needed for processing service requests), the control software leaves it in place and waits for the next service request (step 508). However, if a virtual server reaches a deactivation delimiter (e.g., it remains idle for the specified length of time), it is no longer needed to handle the current or anticipated workload. The control software removes it from the operating system environment (step 509), freeing up resources that can be allocated to other primary environmental functions.

Customer billing can be based on the number or type of virtual servers deployed as well as the number of transactions and amount of storage used.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for balancing workload among virtual servers configured in a virtual server cluster, the method comprising the computer implemented steps of:

monitoring requests directed to the virtual server cluster and determining if an amount of work represented by the requests exceeds a specified limit;

if the amount of work represented by the requests exceeds the specified limit, automatically deploying a new at least one additional virtual server to the virtual server cluster such that the at least one additional virtual server is added to and operates in tandem with the virtual server cluster, wherein the at least one additional virtual server performs similar functions as the virtual server cluster; and allocating subsequent requests between the virtual servers and the at least one additional server that is newly deployed such that the virtual servers and the at least one additional virtual server operate in tandem as the virtual server cluster, wherein the virtual servers are deployed on a mainframe computer as a plurality of model images executing in a memory of the mainframe computer, and the at least one additional virtual server is deployed by propagating one of the model images into a portion of the memory usable by the at least one additional virtual server to create a new model image, and updating the new model image with local identification parameters of the at least one additional virtual server.

2. The method according to claim 1, wherein the step of automatically deploying at least one additional virtual server comprises deploying a plurality of additional virtual servers.

3. The method according to claim 2, further comprising:

if an amount of work represented by subsequent requests falls below the specified limit, automatically deactivating an appropriate subset of the plurality of additional virtual servers.

4. The method according to claim 2, further comprising:

if any of the plurality of additional virtual servers remains idle for a specified length of time, automatically deactivating the idle virtual servers.

5. The method according to claim 1, wherein the additional virtual server has a subset of a capability of the first virtual server.

6. The method according to claim 1, further comprising:

if an amount of work represented by subsequent requests falls below the specified limit, automatically deactivating the additional virtual server.

7. The method according to claim 1, further comprising:
if the additional virtual server remains idle for a specified length of time, automatically deactivating the additional virtual server.

8. The method according to claim 1, wherein the step of allocating subsequent requests among the first and additional virtual servers is performed by a control program operating on a mainframe hypervisor.

9. The method according to claim 8, wherein the controller program creates a request queue for the virtual servers.

10. A data processing system for balancing workload among virtual servers configured in a virtual server cluster, the data process system comprising at least one hardware data processor and further comprising:
- a means for monitoring requests directed to a first virtual server and determining if an amount of work represented by the requests exceeds a specified limit;
- a means for automatically deploying a new at least one additional virtual server to the virtual server cluster if the amount of work represented by the requests exceeds the specified limit, such that the at least one additional virtual server is added to and operates in tandem with other of the virtual servers of the virtual server cluster, wherein the additional virtual server performs similar functions as the first viral server; and
- a means for allocating subsequent requests between the first and additional virtual servers that are newly deployed such that both the first server and the newly deployed additional virtual servers operate as a part of the virtual server cluster, wherein the virtual servers are deployed on a mainframe computer as a plurality of model images executing in a memory of the mainframe computer, and the at least one additional virtual server is deployed by propagating one of the model images into a portion of the memory usable by the at least one additional virtual server to create a new model image, and updating the new model image with local identification parameters of the at least one additional virtual server.

11. The data processing system according to claim 10, wherein the means for automatically deploying at least one additional virtual server further comprises means for deploying a plurality of additional virtual servers.

12. The data processing system according to claim 11, further comprising:
if an amount of work represented by subsequent requests falls below the specified limit, a means for automatically deactivating an appropriate subset of the plurality of additional virtual server.

13. The data processing system according to claim 11, further comprising:
if any of the plurality of additional virtual servers remain idle for a specified length of time, means for automatically deactivating the idle virtual servers.

14. The data processing system according to claim 10, wherein the additional virtual server has a subset of a capability of the first virtual server.

15. The data processing system according to claim 10, further comprising:
if an amount of work represented by subsequent requests falls below the specified limit, a means for automatically deactivating the additional virtual server.

16. The data processing system according to claim 10, further comprising:
if the additional virtual server remains idle for a specified length of time, means for automatically deactivating the additional virtual server.

* * * * *